United States Patent [19]
Haigh et al.

[11] Patent Number: 5,129,177
[45] Date of Patent: Jul. 14, 1992

[54] FISHING TACKLE

[75] Inventors: Leonard Haigh, Evesham; Victor H. Barley, Pebworth, both of United Kingdom

[73] Assignee: Entaco Limited, Birmingham, United Kingdom

[21] Appl. No.: 540,021

[22] Filed: Jun. 14, 1990

Related U.S. Application Data

[63] Continuation-in-part of Ser. No. 300,024, Jan. 23, 1989, abandoned.

[30] Foreign Application Priority Data

| Jan. 21, 1988 | [GB] | United Kingdom | 8801324 |
| Oct. 6, 1988 | [GB] | United Kingdom | 8823496 |
| Oct. 6, 1988 | [GB] | United Kingdom | 8823498 |
| Nov. 26, 1988 | [GB] | United Kingdom | 8827676 |

[51] Int. Cl.⁵ ............................................. A01K 91/04
[52] U.S. Cl. ........................................ 43/44.83; 24/701
[58] Field of Search ............... 43/44.83, 42.49, 42.74, 43/43.15, 44.84, 44.85; 24/666, 701

[56] References Cited

U.S. PATENT DOCUMENTS

| 1,037,991 | 9/1912 | Robinson | 24/701 |
| 1,078,434 | 11/1913 | Haga | 24/701 |
| 1,156,835 | 10/1915 | Butts | 24/701 |
| 3,161,930 | 12/1964 | Crosson | 24/701 |
| 4,194,273 | 3/1980 | Williams | 24/701 |
| 4,271,999 | 6/1981 | Stravitz | 24/666 |

FOREIGN PATENT DOCUMENTS

69760  9/1915  Austria ................................ 24/666

*Primary Examiner*—Kurt Rowan
*Attorney, Agent, or Firm*—Armstrong & Kubovcik

[57] ABSTRACT

A fishing tackle having a longitudinal axis and comprising an element having a first attachment means whereby a member is attached to the element, wherein said attachment means comprises wall means defining a passageway terminating in and extending between open mouths disposed transversely to said axis of the fishing tackle and said member having a body part, a transversely extending part rigid with the body part and having a free end, sold transversely extending part projecting rigidly from said body part in a predetermined transverse relationship to said axis of the fishing tackle and into said passageway through an open mouth at one end thereof and retaining means to retain said transversely extending part in said passageway.

19 Claims, 8 Drawing Sheets

FISHING TACKLE

This is a continuation-in-part of Application Ser. No. 300,024 filed Jan. 23, 1989, now abandoned.

BACKGROUND OF THE INVENTION

This invention relates to fishing tackle and especially, but not exclusively to fishing tackle having an element, which may comprise a snood, connected to a member such as a fishing hook or a fishing line.

The fishing line may be of the "long line" type having a plurality of hooks connected at spaced positions along the length of the line by a plurality of snoods. The length of such "long lines" varies from several metres up to two or three kilometers or even longer with snoods at typically a half to one meter intervals along at least a substantial part of the line length.

SUMMARY OF THE INVENTION

Objects of the present invention are to provide a new and improved fishing tackle, and a fishing snood and a hook for use in such a fishing tackle.

According to a first aspect of the invention we provide a fishing tackle comprising an element having first attachment means for attaching a member to the element.

The attachment means may be adapted releasably to attach the member to the element.

The first attachment means may comprise a transverse abutment part. The attachment means may be adapted to releasably mechanically interengage with the member.

The attachment means may comprise a transverse abutment part which extends transversely to a longitudinal axis of a body part of the element and is adapted to abut a transversely extending part of the member. Means may be provided to retain said transverse abutment part in connecting relationship with the member.

The attachment means may comprise an enlarged portion, at one end of the body part, having a transversely extending passageway therethrough, the end wall of the passageway at the end thereof distant from the elongate body part providing said transverse abutment part.

The side walls of the passageway may be formed so as releasably to retain the transverse abutment part adjacent said end wall of the passageway.

The side walls may be formed with a rib upstanding from at least one side wall and adapted to engage a part of the member facing away from the end wall.

In a first more specific aspect of the invention the element may be provided with a second attachment means similar to said first attachment means.

In a second more specific aspect of the invention the element may be provided with a second attachment means which comprises a transversely extending part of the other end of the element to the first attachment means, the transversely extending part having a free end adapted to be received within an opening of a member such as an eye of a conventional fishing swivel comprising a pair of eyes connected together in rotatable interengagement.

The transversely extending part of the second attachment means may have a retaining means which projects transversely relative to the longitudinal extent of the transversely extending part and is adapted to engage the member to retain the member in engagement with the transversely extending part.

In all aspects of the invention the or each attachment means may be preformed.

The or each preformed attachment means may comprise a portion formed integrally with the remainder of the element.

The element may comprise a monofilament synthetic plastics material or a multifilament synthetic plastics material.

The body part may be of a drawn synthetic plastics material and the or each attachment means is undrawn.

The synthetic plastics material may comprise nylon.

The element may be a snood having an elongate small-diameter body part.

The majority of the body part of the snood, except for the attachment means, may be a maximum cross-sectional dimension of less than 2 to 2.5 mm.

The body part of the snood may be a portion adjacent to at least the first attachment means which is of greater diameter than the majority of the length of the body part.

The element may have a tensile strength of more than 50,000 lbs. per square inch (345,000 kPa) and a tensile elongation of less than 15%.

Where the element has an attachment means comprising a transverse abutment part which extends transversely to said longitudinal axis of the body part, the element may be provided in combination with a member comprising a body part having a functional part and a retaining part spaced transversely from the body part and connected thereto by said transversely extending part of the member.

The retaining part may be adapted to be passed through said passage so that the transverse abutment part of the attachment means is embraced by the body part, retaining part and transversely extending part of the member.

The end wall of the attachment means may be provided with a pair of grooves in its oppositely transversely facing side walls to receive part of the body part and retaining means therein and thus restrain the member from pivotal movement about a transverse axis relative to the attachment means.

The distance between the end wall of the passageway with which the member abuts and the oppositely transversely extending end wall may be substantially the same as the length of the retaining part.

The member may be a hook and the hook may be engaged with the first attachment means and the body part of the hook comprising a shank having, at one end, said functional part, which comprises a hook shaped tine, and having, at the other end, said transversely extending part and said retaining part.

Adjacent said other end of the shank the hook may be of generally U-shape, one limb of the U being integral with the shank of the hook, and the other limb of the U providing said retaining part and being of shorter length than the shank of the hook, terminating at a free end and the base part of the U comprising said transversely extending part of the hook.

The first attachment means may be a configuration such that no crosssectional dimension greatly exceeds the diameter of the hook shank to be attached thereto.

Alternatively the member may be a swivel, and the swivel may be engaged with first attachment means or with a second attachment means similar to the first attachment means, the body part of the swivel comprising a shank having, at one end, said functional part, which comprises a swivel connector to connect the body part rotatably to a further component, and has, at the other end, said transversely extending part and said retaining part.

An element according to the second more specific aspect of the invention may be provided in combination with a member having an opening in which the transversely extending part is received.

The retaining means may be of a cross-section so as to be incapable of passage through the opening, in which case the element is attached to the member by passing the other end of the element through the opening of the member and then manipulating the length of the element through the opening followed by manipulating the transversely extending part into the opening until the retaining means abuts against the part defining the opening.

A secondary retaining means may be provided which is capable of passage through the opening to retain the part defining the opening between the retaining means and the secondary retaining means.

The secondary retaining means may comprise a localised projection or projections in the form of pips or a flange of appropriate dimension extending circumferentially or part circumferentially around a transversely extending part and of a size relative to the opening so as to resist withdrawal of the transversely extending part from the opening. Alternatively the retaining means may be of a configuration as to permit of passage thereof through the opening in one direction for assembly of the element with the member and to restrain removal of the retaining means from the opening.

The retaining means may comprise an outwardly extending head or flange having a part cut away or chamfered to permit of entry thereof into the opening of the member.

Secondary retaining means may be provided to retain the part defining the opening between the retaining means and the secondary retaining means.

The secondary retaining means may comprise a part circumferentially extending flange such as a semi-circular flange or other projection for restraining engagement with the part defining the opening of the member and of a size relative to the eye of the swivel so as to resist withdrawal of the transversely extending part from the opening.

The member of the second more specific aspect of the invention may be a swivel connector, said opening comprising an eye rotatably connected to a further eye or the like.

According to a second aspect of the invention we provide a fishing hook comprising a shank having a hook part adjacent one end and a transversely extending part adjacent the other end with a retaining part spaced transversely from the shank and connected thereto by said transversely extending part.

Adjacent said other end of the shank the hook may be of generally U-shape, one limb of the U being integral with the shank of the hook and the other limb of the U providing said retaining part and being of shorter length than the shank of the hook and terminating at a free end and the base part of the U comprising said transversely extending part of the hook.

According to a third aspect of the invention we provide a fishing swivel comprising a shank having adjacent one end a swivel connector to connect the shank rotatably to a connector part, adapted to be connected to a fishing line, and adjacent the other end, a transversely extending part with a retaining part spaced transversely from the shank and connected thereto by said transversely extending part.

Said other end of the shank the swivel may be of generally U-shape, one limb of the U being integral with the shank and the other limb of the U providing said retaining part and being of shorter length than the shank and terminating at a free end and the base part of the U comprising said transversely extending part.

According to a fourth aspect of the invention we provide fishing tackle comprising a fishing line, a swivel attached thereto and a snood according to the first aspect of the invention connected to the swivel and a fishing hook according to the second aspect of the invention attached to the snood and/or wherein the swivel is according to the third aspect of the invention.

The fishing line may have a plurality of swivels attached thereto at spaced intervals thereon and a snood according to the first aspect of the invention being connected to at least a plurality of said swivels and a fishing hook according to the second aspect of the invention being connected to said snoods and/or wherein the swivels are according to the third aspect of the invention.

The swivels may be attached to the fishing lines by leaders.

The fishing line may be adapted to be suspended below the water surface by a plurality of buoys.

The fishing line may be a "long line".

According to a fifth aspect of the invention we provide a method of making a snood according to the first aspect of the invention comprising the steps of taking a blank comprising an elongate part having an attachment means formed integrally therewith, and stretching the elongate part to a predetermined extent, for a predetermined time at a temperature lying in a predetermined elevated temperature range.

The blank may be made by performing a moulding operation in which the elongate part and the attachment means are formed integrally with each other during said moulding operation.

The stretching operation may be performed so that the ratio of the maximum cross-sectional dimension of the elongate portion before and after stretching lies in the range 2:1 to 5:1.

The stretching operation may be carried out for a time lying in the range 13 to 25 seconds.

The elevated temperature range may comprise 130° C.–220° C.

A moulding operation to provide an element such as a snood with an elongate part of the required length to diameter ratio is not practicable. Further, a moulded snood, however thin, may have insufficient tensile strength, and may be prone to elongation as a tensile force is applied. However, by stretching the blank so that the ratio of the maximum cross-sectional dimension of the elongate portion before and after stretching lies, for example, in the range 2:1 to 5:1, a snood with an elongate part of adequate thinness and sufficient tensile strength and limited elongation is achieved whilst permitting performing a moulding operation in which the attachment means is formed.

According to a sixth aspect of the invention we provide a method of attaching a fishing tackle element, having a transverse abutment part which extends transversely to a longitudinal axis of a body part of the element and is adapted to abut a transversely extending part of the member, to the member including the step of moving the member relative to the attachment means in a direction transverse to said longitudinal axis to position the transverse abutment part in position to abut the transversely extending part of the member.

The method may include the subsequent step of moving the member relative to the attachment means in a direction longitudinally of said axis to move the transverse abutment part into abutment with the transversely extending part of the member.

According to a seventh aspect of the invention we provide a fishing tackle having a longitudinal axis and comprising an element having a first attachment means whereby a member is attached to the element wherein said attachment means comprises a transverse abutment part which extends transversely to said axis and abuts a transversely extending part of the member which extends transversely to said axis, said abutment part of the element being laterally displaceable, to permit of release of the member from the element, when a predetermined separating force is applied to the member parallel to said axis.

According to an eighth aspect of the invention we provide a method of fishing including attaching a fishing tackle element, having a transverse abutment part which extends transversely to a longitudinal axis of a body part of the element and is adapted to abut a transversely extending part of the member, to the member including the step of moving the member relative to the attachment means in a direction transverse to said longitudinal axis to position the transverse abutment part in position to abut the transversely extending part of the member and, thereafter, releasing the member from the element by applying a predetermined separating force to the element in a direction having at least a component parallel to the longitudinal axis.

The method may include the further attaching step of moving the member relative to the attachment means in a direction longitudinally of said axis to move the transverse abutment part into abutment with the transversely extending part of the member.

BRIEF DESCRIPTION OF THE DRAWINGS

Embodiments of the invention will now be described by way of example with reference to the accompanying drawings wherein.

DESCRIPTION OF THE PREFERRED EMBODIMENTS

Figure 7:
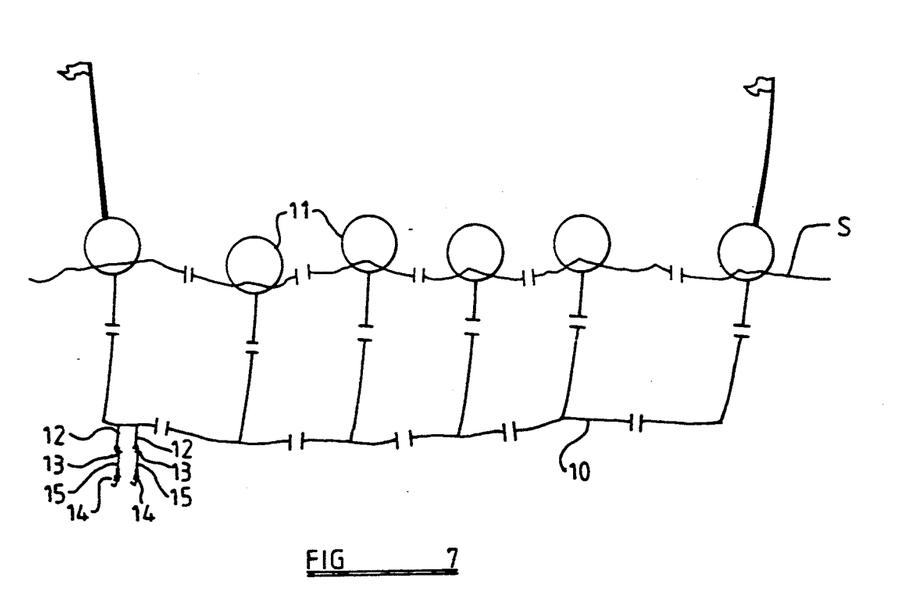
FIG. 7 is a diagrammatic illustration of a long line having a plurality of snoods attached thereto.

Referring now to FIG. 7, there is shown a long line 10 is supported at a desired level below the surface S of the sea by fishing floats 11. The long line 10 may be of any desired length but is typically up to two or three kilometers in length, although it may be shorter or longer than this. At spaced positions along the length of the long line 10, for example at one meter or half meter intervals, are provided leaders 12 connected to the long line 10 in conventional manner. Each leader 12 is connected, in conventional manner to a swivel 13 to which a hook 14 is connected by a snood 15.

Figure 1:
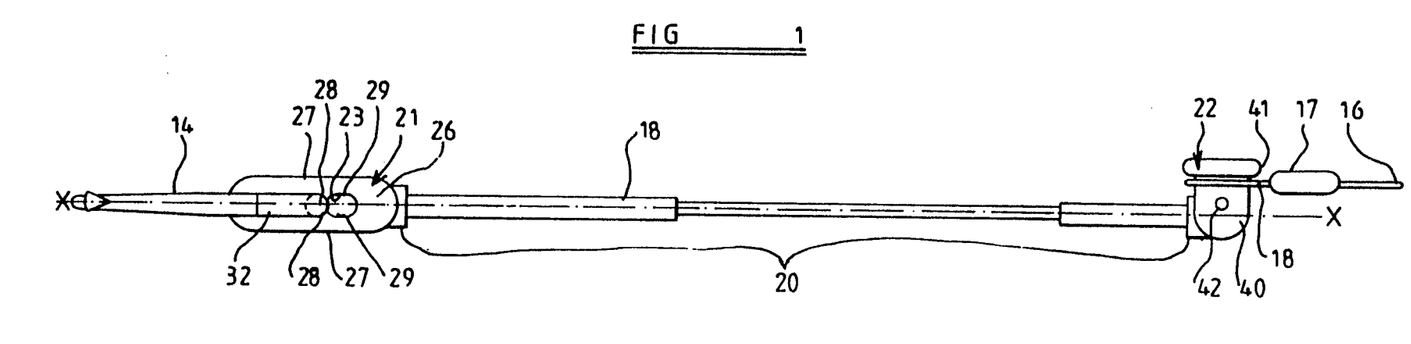
FIG. 1 is a front elevation of a snood embodying the invention.
Figure 2:
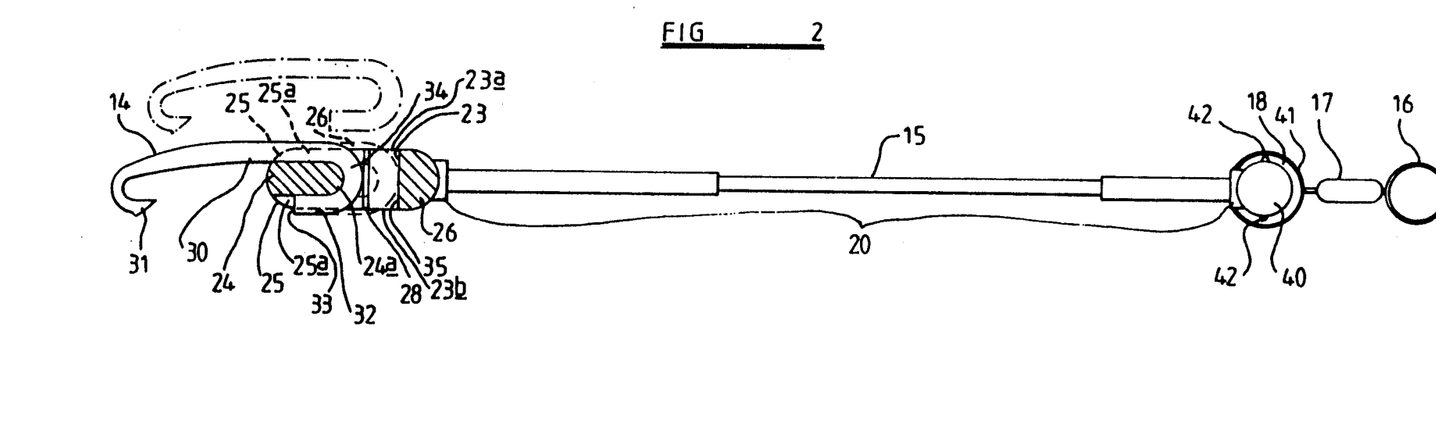
FIG. 2 is an underneath plan view of the snood of FIG. 1.

Referring now to FIGS. 1 and 2, each swivel 13 comprises a first eye 16 connected in conventional manner, for example by tying, to the leader 12. The eye 16 is connected by a rotatable joint 17 to a second eye 18 which is releasably connected to the snood 15.

The snood 15 comprises an elongate circular in cross-section body part 20 having a hook attachment means 21 at its "bottom" end and a line attachment means 22 at its "top" end and comprising a out-piece unitary structure made by moulding an intermediate product in an injection moulding apparatus, the intermediate product having the attachment means 21, 22, hereinafter to be described in more detail, moulded in their final form, and having a part corresponding to the body part 20 but of greater diameter but shorter length than the finished dimensions illustrated in the Figures. The part of the intermediate product corresponding to the body part 20 is heated and stretched by gripping the attachment means 21, 22 in relatively movable grippers and moving the grippers apart until the body part is formed to the final configuration shown in the Figures. The intermediate product has a stepped body part to provide the final dimensions illustrated.

Typically, the body part is heated by suitable means such as by contact with heater blocks and the stretching operation is performed over a period of time lying in the range 30 to 25 seconds whilst the body part is heated to a temperature lying in the range 130° to 220° C. where, as in the present case, the material of the snood is nylon. The blank is elongated such that the ratio of the maximum cross-section dimension (normally the diameter, since the body part would normally be of cylindrical configuration) of the elongate body part before and after stretching lies in the range 2:1 to 5:1 and the length of the snood is increased in the corresponding ratio. The snood has a length of diameter ratio lying, for example, in the range 1:600 and 1:1250.

With presently available moulding techniques it is not practicable to make a finished snood having a length of diameter ratio of, for example, at least 1:600 and hence it is not possible to mould a snood with integrally moulded attachment means and a body part of the required small diameter. In addition, a moulded snood, however thin, would generally have insufficient tensile strength and too much elongation. However, by moulding the attachment means integrally with an elongate part in an intermediate product, where the elongate part has a length of diameter ratio which can be moulded, and subsequently stretching the elongate part to the final desired length to diameter ratio a snood with moulded attachment means is provided in accordance with the present invention with added tensile strength and limited elongation.

Although in this example the snood comprises a monofilament of nylon, it may be made from monofilament of other suitable material (such as polyethelene or polyester) in which a snood blank can be moulded with integral attachment means and then the elongate parts are stretched to produce a snood of the desired final length to diameter ratio. Alternatively, the snood may be made from multifilament material by moulding attachment means on the multifilament and then performing a stretching operation such as described hereinbefore to produce an elongate body part of the desired length to diameter ratio.

In one example of a snood embodying the present invention an intermediate part was made in RILSAN II nylon by a conventional injection moulding technique. The elongate body part of the intermediate product was approximately 100 mm long and 3 mm diameter over the majority of its length but has parts of 3.75 mm diameter adjacent the ends.

The elongate part was heated to a temperature of 150° C. and the blank was stretched for a period of 20 seconds and the elongate part was stretched to increase the length thereof 4.25×its original length, i.e. to approximately 425 mm. There was a corresponding reduction in the diameter of the elongate part of the intermediate product so that the diameter of the intermediate product was approximately two times larger than the final diameter of the elongate body part of the snood, which was 1.5 mm diameter so far as the smallest diameter portion was concerned whilst the largest diameter of the end portion was correspondingly reduced.

The hook attachment means 21 comprises a generally stirrup shaped part comprising a transversely extending passageway 23 terminating in and extending between open mouths 23a, 23b disposed transversely to a longitudinal axis X—X of the fishing tackle. The passageway 23 is bounded at its bottom end by a transverse abutment part 24 having an abutment surface 24a and transversely facing side surfaces 25 in which grooves 25a are provided.

The transverse abutment part is thus pre-formed and extends transversely to a longitudinal axis X—X over a transverse extent which is greater than the diameter of the body part. The top end of the passage 23 is closed by a cross-head part 26 connected to the transversely extending abutment part 24 by side members 27. Inwardly projecting ribs 28 are provided on the inwardly facing surfaces 29 of the side walls 27.

The hook 14 comprises a body part in the form of a shank 30 having a conventional barbed hook shape 31 at its bottom end and a generally U-shaped configuration at its top end. The longer limb of the U is integral with the remainder of the shank 30 of the hook whilst the shorter limb 32 of the U terminates at a free end 33 and is connected to the longer limb 30 by a transversely extending part 34 which is rigid with the body part and projects rigidly therefrom in a predetermined transverse relationship, i.e. perpendicular, to the axis X—X. The part 34 provides a retaining part which is spaced transversely from the shank. The shank and U-shaped parts of the hook are of circular cross-section.

The distance between the abutment surface 24a and an opposed surface 35 of the cross head 26 approximates to the length of the shorter limb 32 of the U, i.e. the distance between the free end 33 and a tangent to the outer surface of the base part 34.

In use, the shorter limb 32 of the hook is introduced into said passageway through an open mouth 23a and is fed transversely through the passageway 23 until the shank 30 engages one of the grooves 25a whereupon the hook is moved longitudinally in the direction of the axis X—X to move the base of the U past the opposed ribs 28 so that the ribs abut against the curved surface of the base of the U and serve to retain the hook with the abutment surface 24a in engagement with the inner surface of the part 34 of the hook. The shorter limb 32 is received within the other groove 25a and hence the transverse abutment part 24 is embraced by the shank 30, transversely extending part 34 and retaining part 32 of the hook. The hook 14 is therefore retained releasably in attachment with the snood by the attachment means 21 by virtue of releasable mechanical interengagement therewith. If it is desired to replace the hook, it is simply necessary to manipulate the hook initially axially parallel to the axis X—X to move the part 34 past the ribs 28 and then to withdraw the retaining part 32 transversely from the passageway 23.

The line attachment means 22 comprises a transversely extending part 40 of cylindrical configuration and projecting from one side of the central axis X—X. At its free end the transversely extending part 40 has an outwardly extending flange 41 of a diameter such that it cannot pass through the eye 18 of the swivel 13. The transversely extending part 40 is provided with a pair of diametrically opposed secondary retaining pips 42 of a length so that they can be just passed through the eye 18 but serve to retain the eye 18 between the pips 42 and the flange 41 unless considerable force is applied to the eye 18 to move it past the pips 42.

In order to assemble the snood to the swivel, the bottom end of the snood, i.e. the hook attachment means 21, is first passed through the eye 18, then the body part of the snood, followed by manipulation of the transversely extending part 40 and the pips 42 thereof through the eye 18 with the aid of a tool for convenience in passing the pips 42. When it is desired to remove the snood from the swivel, the pips 42 are forced through the eye 18 in the reverse direction, again with the aid of a suitable tool and the reverse sequence of operations is then performed. If desired, it is possible both to connect the snood and disconnect the snood from the swivel with the hook 14 connected to the snood by manipulating the hook 14 through the eye 18.

Figure 3:
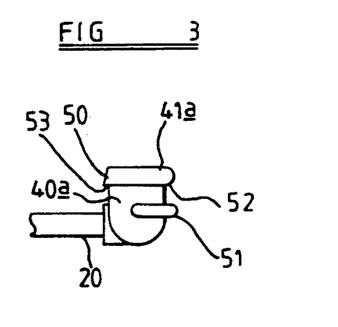
FIG. 3 is a fragmentary front elevation of a modification of the snood of FIG. 1.
Figure 4:
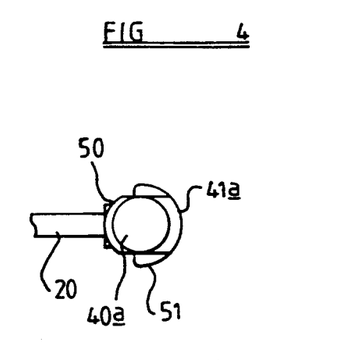
FIG. 4 is a fragmentary underneath plan view of the modification shown in FIG. 3.

In a modification, shown in FIGS. 3 and 4, the flange 41 extends through only a limited circumferential extent, as shown at 41a in FIG. 4, and the diametrically opposite portion is chamfered as shown at 50. Consequently, the transversely extending part 40a shown in FIGS. 3 and 4 can be inserted into the eye 18 by first manipulating the flange part 41a through the eye and then forcing the diametrically opposite part 50 therethrough, preferably with the aid of a special tool. The shoulders 52, 53 provided by the flange 41a and part 50 respectively, serve to prevent withdrawal of the transversely extending part 40a from the eye 18, whilst a semi-circular flange 51, together with the adjacent part of the snood body 20 prevents passage of the transversely extending part 40a through the eye 18 in the opposite direction, so that the eye 18 is trapped between the flange 41a and the snood body 20 on the one side and the flange parts 52, 53 on the other side.

When it is desired to remove the snood from the swivel, this can be done by performing the above described operation in reverse, preferably with the aid of a tool to force the shoulder 53 of the chamfered part 50 through the eye 18.

The snood is therefore retained releasably in attachment with the swivel by the attachment means 32 by virtue of releasable mechanical interengagement therewith.

Figure 5:
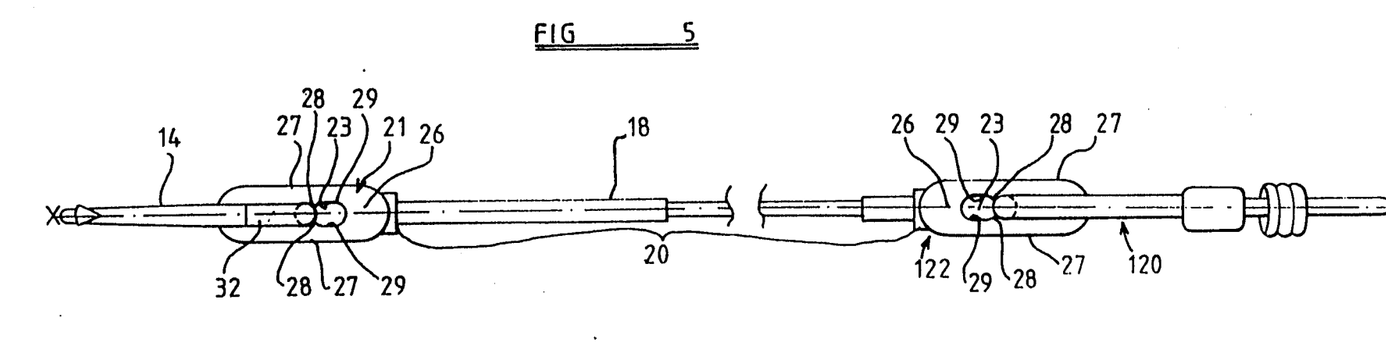
FIG. 5 is a fragmentary front elevation of another modification of the snood of FIG. 1.
Figure 6:
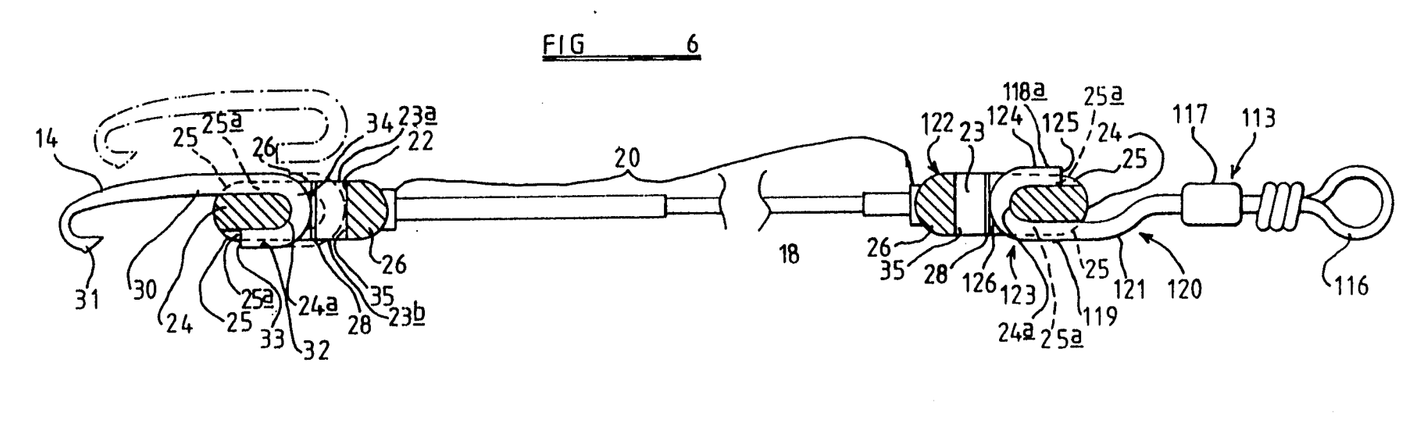
FIG. 6 is a fragmentary underneath plan view of the modification shown in FIG. 5.

In another modification, shown in FIGS. 5 and 6, the line (second) attachment means for the swivel is shown at 122 and in this modification is of the same configuration as the hook attachment means 21 provided at the other end of the snood and hence the description of the attachment means 21 contained hereinbefore is equally applicable to the attachment means shown at 122 and the same reference numerals have therefore been used in connection with the attachment means 122 as are used in FIGS. 1 and 2 in connection with the attachment means 21.

In this embodiment a swivel 113 is provided having a first eye 116 and a rotatable joint 117 as described in connection with the swivel 13 but in this embodiment the second eye 118 is modified so as to be of generally U-shape. That is to say, extending from the rotatable joint 117 is a body 120 comprising a shank 121 having at one end said rotatable joint 117 and at its other end limbs of generally U-shape configuration, the longer limb 119 of the U 123 being integral with the remainder of the shank 121, whilst the shorter limb 124 of the U terminates at a free end 125. The shank 121 is cranked so that the central axis of the U 123 is co-axial with the axis of rotation of the rotatable joint 117. The shorter limb 124 is connected to the longer limb 119 by a transversely extending part 126 and provides a retaining part which is spaced transversely from the shank 121. The shank and U-shaped parts of the swivel are of circular cross-section.

The distance between the abutment surface 24a and an opposed surface 35 of the cross-head 26 approximates to the length of the shorter limb 125 of the U 123, i.e. the distance between the free end 125 and a tangent to the outer surface of the base part 34.

In use, the shorter limb 124 is fed transversely through the passageway 23 until the limb 122 engages one of the grooves 25a, whereupon the swivel is moved longitudinally in the direction of the axis X—X to move the base of the U past the opposed ribs 28 so that the ribs abut against the curved surface of the base of the U 123 and serve to retain the swivel with the abutment surface 24a in engagement with the inner surface of the part 126 of the swivel. The shorter limb 124 is received within the other groove 25a and hence the transverse abutment part 24 is embraced by the shank 121, transversely extending part 126 and retaining part 124 of the swivel. The swivel 113 is therefore retained releasably in attachment with the snood by the attachment means 122 by virtue of releasable mechanical interengagement therewith. If it is desired to replace the snood, it is simply necessary to manipulate the swivel initially axially parallel to the axis X—X to move the part 126 past the ribs 28 and then to withdraw the retaining part 124 transversely from the passageway 23. In the embodiment illustrated, the attachment means 21 and 122 are identical and thus a hook or swivel can be attached to either end of the snood. If desired, however, the attachment means 122 may be of different size to the attachment 21, although of the same general configuration, if it is found convenient to make the attachment means for connection to the hook either larger or smaller than the attachment means for connection to a swivel and of course the corresponding parts of the hook and swivel would be correspondingly dimensioned.

In the case of the above described example the tensile strength of the snood was measured and was found to be 67,218 lbs per sq. inch (463,468 kPa). The assembly failed in the elongate part of the snood, well spaced from the attachment means, thereby demonstrating that the attachment means do not comprise the weakest part of the assembly snood as was frequently the previous case when a conventional hitch or other knot comprised the attachment means.

Figure 12:
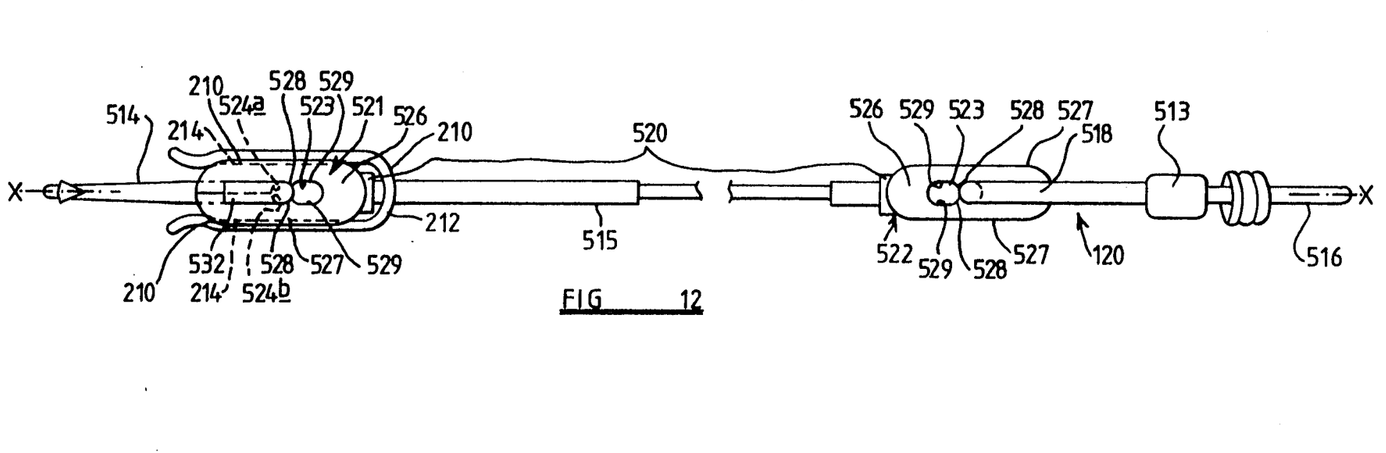
FIG. 12 is a front elevation of another snood embodying the invention.
Figure 13:
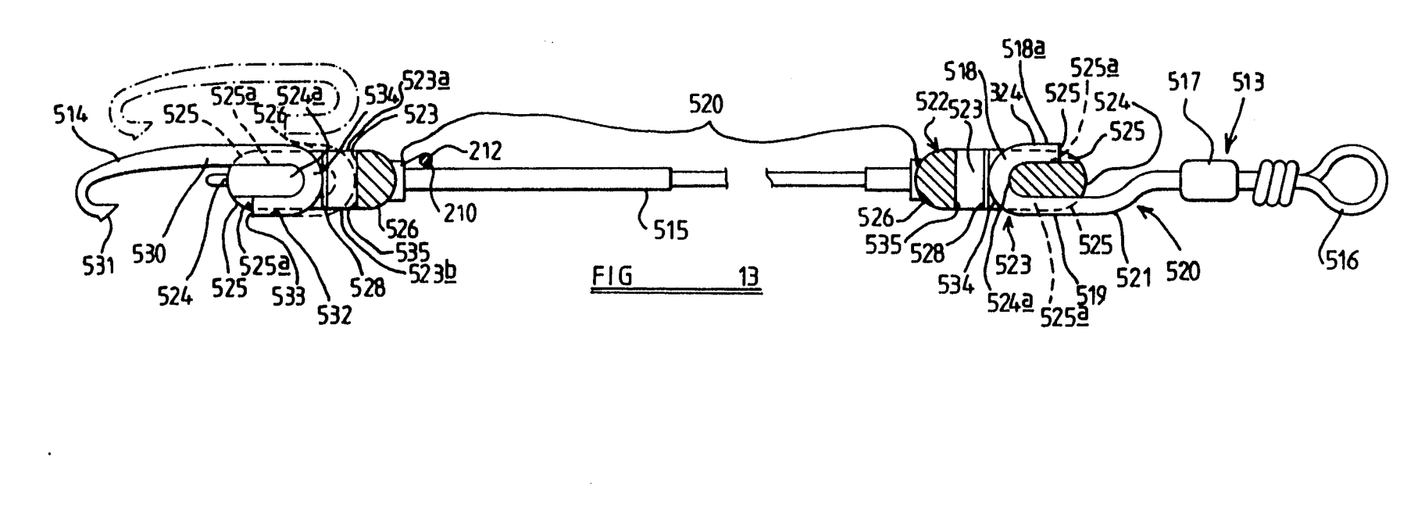
FIG. 13 is an underneath plan view, partly in section, of the snood of FIG. 12.

Referring now to FIGS. 12 and 13, in this embodiment, which except as hereinafter described is the same as the embodiment of FIGS. 5 and 6, and in which the same reference numbers have been used for corresponding parts but with a prefix of 5, the hook attachment means 521 comprises a generally stirrup shaped part comprising a transversely extending passageway 523 bounded at its bottom end by a split transverse abutment part 524 having a pair of abutment surfaces 524a, 524b and transversely facing side surfaces 525 in which grooves 525a are provided.

The transverse abutment part is thus pre-formed and extends transversely to a longitudinal axis X—X of the body part 520 over a transverse extend which is greater than the diameter of the body part. The top end of the passage 522 is closed by a cross-head part 526 connected to the transversely extending abutment part 524 by side members 527. Inwardly projecting ribs 528 are provided on the inwardly facing surfaces 529 of the side walls 527.

A resilient biasing means 210 is mounted on the stirrup shaped part to bias the side members 527 together and hence normally to maintain the abutment surfaces 524a, 524b together. However, when a longitudinal force is imposed on the abutments surfaces 524a, 524b in use when the snood assembly is passed through a suitable apparatus to remove fish from the fishing tackle, the resultant force forces the abutment surfaces 524a, 524b apart against the bias of the resilient biasing means 210. There is thereby provided a facility whereby hooks may be automatically released from the fishing tackle simply by applying a suitable longitudinal force to the hooks, for example by appropriately urging a fish impaled on a hook.

The bias provided by the resilient biasing means is arranged so that the hook remains attached to the snood until the longitudinal load exceeds a predetermined value.

In the embodiment shown in FIGS. 12 and 13 the resilient biasing means 210 comprises a generally U-shaped spring steel clip comprising two spaced parallel limbs 211 which extend longitudinally and externally of the side members 527 and which are integrally formed with a generally U-shaped base part 212 which is offset to accommodate the body part of the snood. The free ends of the limbs 211 are splayed outwardly to facilitate assembly and part circular grooves 214 are formed in the external surfaces of the side members 527 to retain the clip in position.

Figure 14:
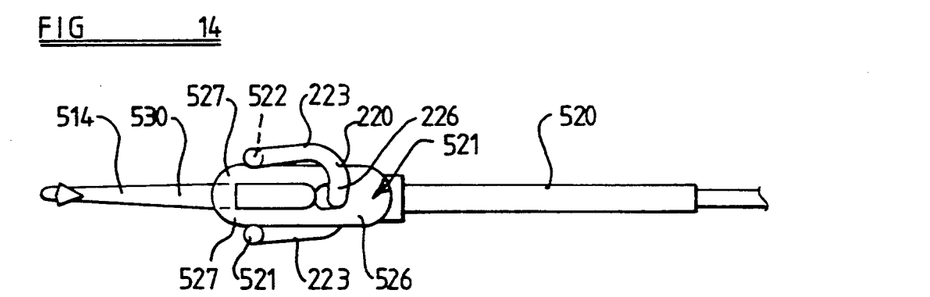
FIG. 14 is a fragmentary front elevation of a modification of the snood of FIG. 12.
Figure 15:
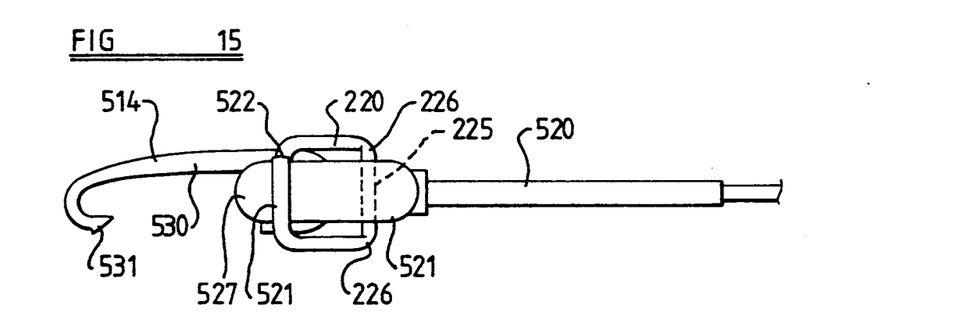
FIG. 15 is a fragmentary underneath plan view of the modification shown in FIG. 14.

In a modification shown in FIGS. 14 and 15, which is as described in connection with FIGS. 12 and 13 except as hereinafter described, the resilient biasing means is indicated generally at 220 and comprises a spring steel clip in the form of a torsion spring comprising free end parts 221, 222 which act on opposite sides of the side members 527 adjacent the abutment surfaces 524a, 524b and which are connected by longitudinally extending legs 223 to a integrally formed transversely extending part 225, which passes through the passage means 523, by oppositely directed shoulder parts 226, 227. The mode of operation is as in the previously described embodiment.

Figure 16:
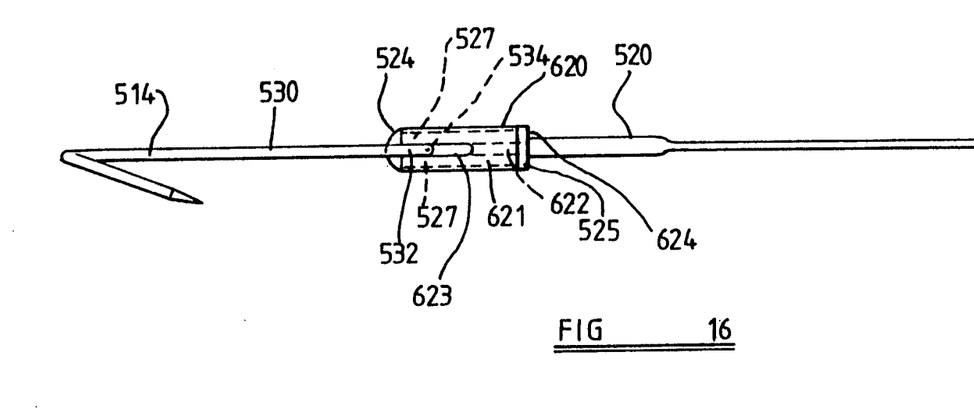
FIG. 16 is a fragmentary front elevation of another modification of the snood of FIG. 12.
Figure 17:
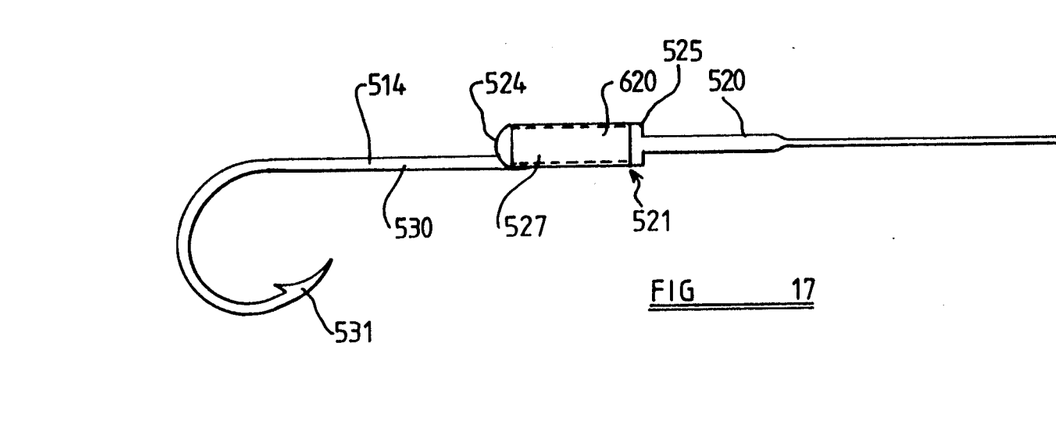
FIG. 17 is a fragmentary underneath plan view of the modification of FIG. 16.

In a further modification shown in FIGS. 16 and 17, which is as described in connection with FIGS. 12 and 13 except as hereinafter to be described, the resilient biasing means is indicated generally at 620 and comprises a spring steel sleeve in the form of a generally cylindrical tubular body 621 made by stamping a generally rectangular blank from a sheet of material and then rolling the blank to cylindrical tubular shape leaving a longitudinally extending gap 622 between the adjacent edges of the blank after forming to tubular shape so as to leave an opening for the transversely extending part 534 of the hook 514. The sleeve is also provided with a diametrically opposite slot 623 which extends only partially longitudinally of the sleeve to permit passage of the transversely extending part 534 and the retaining part 532 of the hook 514. The hook attachment means 520 is provided with collar or flange parts 524, 525 at opposite ends which project slightly outwardly compared with the remainder of the attachment means therebetween so as to provide retaining flanges for the sleeve 620. The inherent resilience provided by the sleeve 620 serves to urge the side members 527 together and again the mode of operation is as in the previously described embodiments.

If desired any other suitable resilient biasing means may be provided, either separately or formed integrally. For example, a suitable spring steel or other material resilient biasing means may be moulded integrally with the hook attachment means 21 so as to be embedded therein if desired. Alternatively the material of which the hook attachment means is formed may have sufficient resilient bias to retain the hook depending upon the longitudinally extending load of which it is desired that the hook becomes released.

The hook 514 comprises a shank 530 having a conventional barbed hook shape 531 at its bottom end and a generally U-shaped configuration at its top end, the longer limb of the U being integral with the remainder of the shank 530 of the hook whilst the shorter limb 532 of the U terminates at a free end 533, is connected to the longer limb 530 by a transversely extending part 534 and providing a retaining part which is spaced transversely from the shank. The shank and U-shaped parts of the hook are of circular cross-section.

The distance between the abutment surfaces 524a, 524b and an opposed surface 535 of the cross head 526 approximates to the length of the shorter limb 532 of the U, i.e. the distance between the free end 533 and a tangent to the outer surface of the base part 534.

In use, the shorter limb 532 of the hook is fed transversely through the open mouth 523a into the passageway 523 until the shank 530 engages one of the grooves 525a whereupon the hook is moved longitudinally in the direction of the axis X—X to move the base of the U past the opposed ribs 528 so that the ribs abut against the curved surface of the base of the U and serve to retain the hook with the abutment surface 524a in engagement with the inner surface of the part 534 of the hook. The shorter limb 532 is received within the other groove 525a and hence the transverse abutment part 524 is embraced by the shank 530, transversely extending part 534 and retaining part 532 of the hook. The hook 514 is therefore retained releasably in attachment with the snood by the attachment means 521 by virtue of releasable mechanical inter-engagement therewith. If it is desired to replace the hook, it is simply necessary to manipulate the hook initially axially parallel to the axis X—X to move the part 34 past the ribs 28 and then to withdraw the retaining part 32 transversely from the passageway 523.

The line attachment means 522 is the same as the line attachment means 22 described with reference to FIGS. 5 and 6.

The diameter of the elongate part of the snood intermediate part is determined by experiment so as to produce a finished snood of the required strength, flexibility and size to hold a selected load. Other forms of heating device may be provided so long as they are capable of heating the elongate part accurately to the desired temperature and again any desired elongating means may be provided so long as it elongates the moulding by grasping it in both extremities so as to extend the heated area without extending the attachment means. The diameter and the amount of elongation vary depending upon the desired final diameter and are determined empirically. A snood according to the present invention avoids the disadvantages encountered in practice when a snood is fastened to a fishing line or hook by tying a hitch or other knot since it is found that in such circumstances the strengh of the snood is diminished in the region of the hitch or other knot and the snood typically falls at the hitch or other knot.

Figure 9:
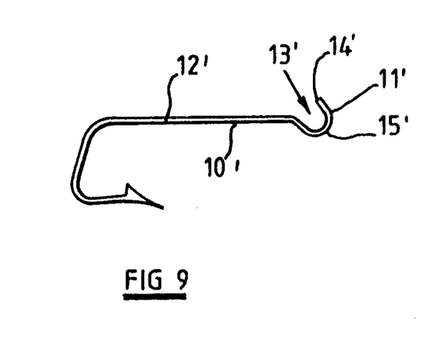
FIG. 9 illustrates the hook of FIG. 8 prior to attachment to the snood.

Referring to FIG. 9, there is shown a fish hook 10' is of conventional form having a part formed eye 11 at one end of a shank 12'. The eye 11' has a gap 13' between the shank 12' and a free end 14' of a bent over part 15' which provides the eye 11'.

Figure 8:
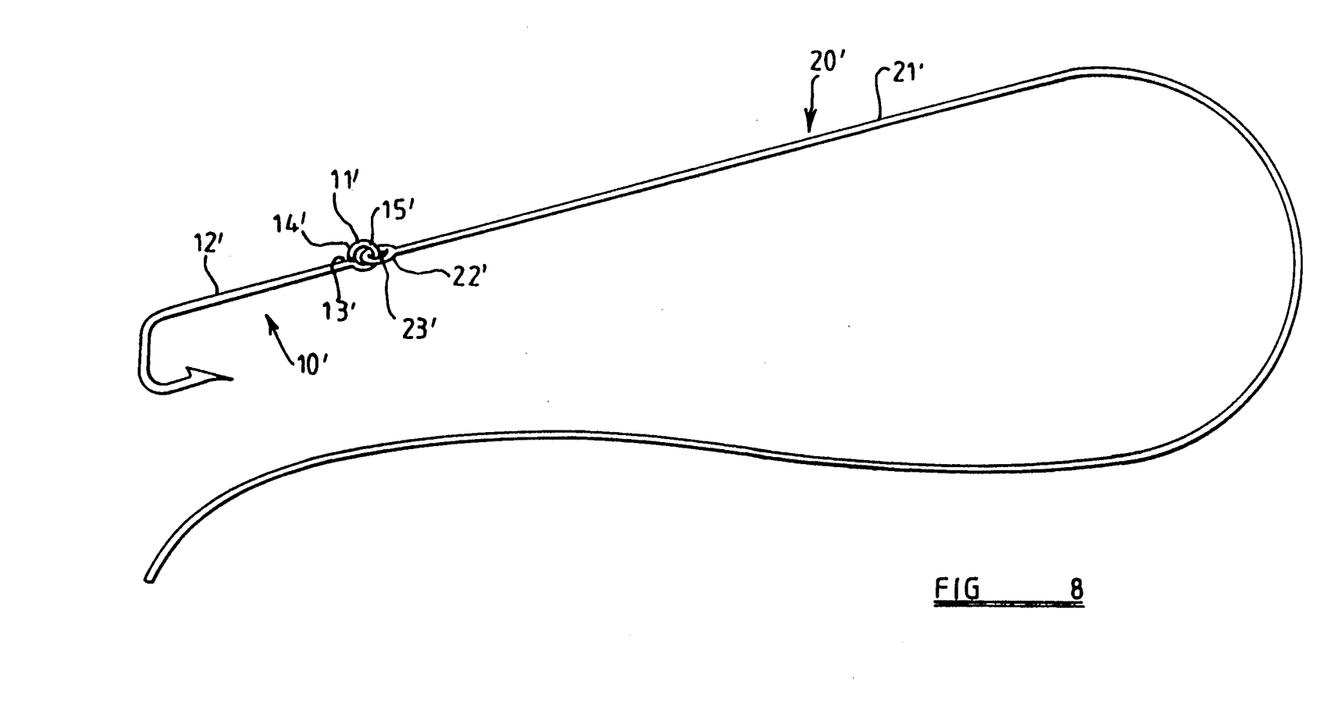
FIG. 8 is a side elevation of an eyed fishing hook having a snood embodying the invention connected thereto.

Referring to FIG. 8, a snood, embodying the invention, is indicated at 20' and comprises a relatively thin elongate part 21' of monofilament nylon having moulded integrally therewith at each end thereof an attachment means 22' comprising a performed eye portion having an aperture 23' so that the bent over part 15' of the eye 11' of the hook 10' can be passed therethrough with the material of the eye portion 22' being passed through the gap 13' described hereinbefore. The part 15' is then acted upon to close or substantially close the gap 13' so that the hook is attached to the snood.

The hook 10' is attached to the snood 20' by means of the preformed attachment means 22' and the attachment does not rely on the making of a hitch or any other form of knot in the snood.

Figure 10:
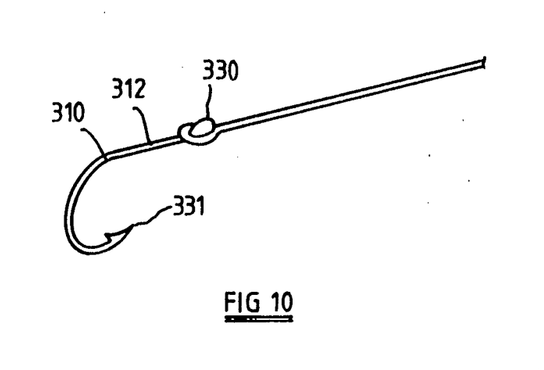
FIG. 10 illustrates an alternative form of hook with which a snood embodying the invention may be used.

If desired a hook of different configuration to that shown in FIG. 8 may be provided. Such as the hook 310 shown in FIG. 10 which at one end of the shank 312 thereof has a flattened portion 330. In this case the hook is attached to the snood by initially passing the tip 331 of the hook 310 through the aperture until further movement is prevented by abutment of the flattened part 330 against the material of the attachment means 22', as a result of the part 330 being of greater transverse dimension than the diameter of the aperture 23. The hook 310 can be released from the snood by reversing the steps.

Figure 11:
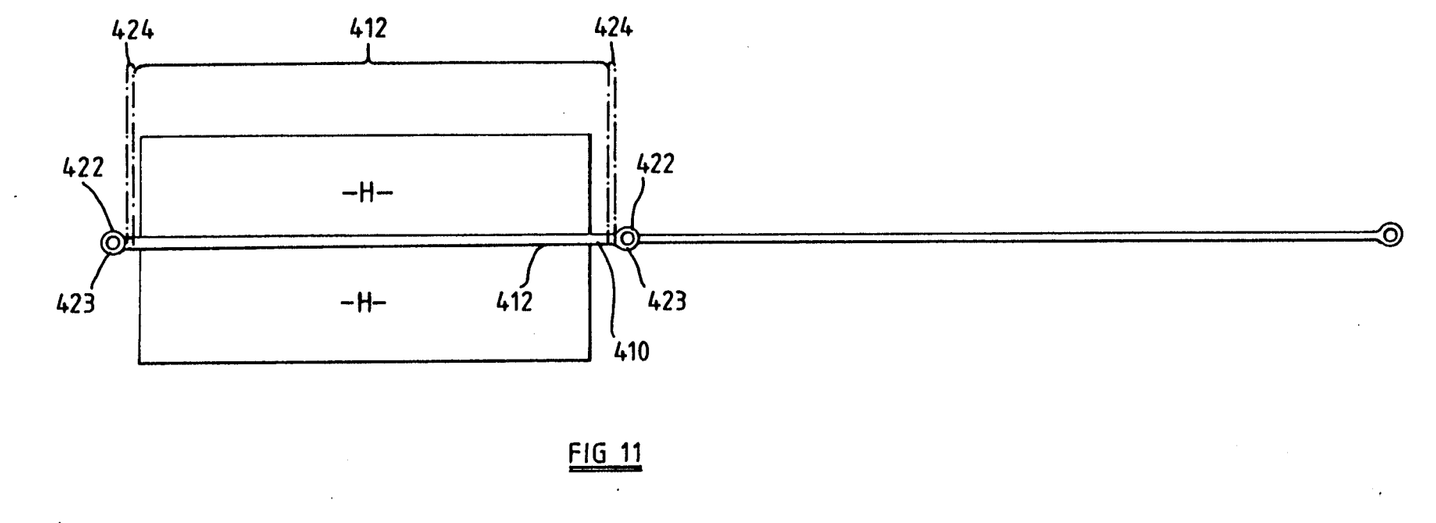
FIG. 11 is a side elevation of part of an apparatus for use in making a snood embodying the invention and illustrating a step in the method of making a snood embodying the invention.

Referring now to FIG. 11 a snood blank is illustrated at 410 and comprises an elongate part 412 having at each end thereof attachment means 422 each of which has a through aperture 423. The attachment means 422 with their associated apertures 423 and the elongate part 412 are all formed integrally with each other by means of a conventional moulding operation in nylon of appropriate characteristic. The thus moulded snood is then heated by a suitable means such as by contact with heater blocks H as shown in FIG. 4 and the attachment means of the snood are engaged with suitable tensioning members, one of which is moved to the right in FIG. 11 until the attachment means 422 occupies the position shown in dotted line in FIG. 4. This stretching operation is performed as described hereinbefore in connection with the previous embodiments and apparatus such as that shown in FIG. 10 can be used for all embodiments.

If desired, the hook may be formed to its final form, for example, as shown in FIG. 8 and used as an insert in the injection moulding tool so that the plastics material of the attachment means 22 is moulded around the eye end of the hook. The heating and stretching operation is then performed as described hereinbefore. In this case retention is provided in part by mechanical inter-engagement between a transverse abutment part of the snood attachment means within the eye 11' in abutment with a transversely extending part of the hook provided by the transversely extending arc of the eye 11' on the side thereof remote from the hook tine.

If desired the hook and attachment parts may be of other configuration to that described above and preferably to provide a releasable mechanical inter-engagement between snood and hook and/or swivel. Where an attachment means has a transverse abutment part it preferably extends over a transverse extent which is not less than the minimum transverse dimension of the body part so as to provide adequate strength. If desired the releasable mechanical inter-engagement may be between an attachment means and a part permanently or releasably connected to the hook and/or between an attachment means and a connecting element attached to the line with or without the interposition of a swivel.

The present invention permits, in preferred embodiments, of simple easy replacement of hook and/or snood. Although the invention is primarily intended for use in commercial fishing operations with long lines, if desired the invention may be used in any desired application, for example, in recreational fishing where a single hook may be attached to a line using a snood embodying the invention.

The attachment means configuration described hereinbefore in connection with a snood of moulded and drawn synthetic plastics material may be utilised, if desired, in other elements of fishing tackle and/or with a snood made in a different way or of different material. If desired any configuration described hereinbefore for a hook (first) attachment means may be used for a line (second) attachment means and vice versa.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. A fishing tackle comprising an elongate snood having an elongate small diameter body part, of drawn synthetic plastics material, having a longitudinal axis and, integral therewith at one end of the body part, a pre-formed undrawn synthetic plastics material, first attachment means whereby a member is attached to the snood, wherein said attachment means comprises wall means defining a passageway terminating in and extending between open mouths disposed transversely to said axis of the fishing tackle, and said member having a body part, a transversely extending part rigid with the member body part and having a free end, said transversely extending part projecting rigidly from said member body part in a predetermined transverse relationship to said axis of the fishing tackle and into said passageway through an open mouth at one end thereof and retaining means to retain said transversely extending part in said passageway.

2. A fishing tackle according to claim 1 wherein the element is provided with a second attachment means similar to said first attachment means.

3. A fishing tackle according to claim 1 wherein a side wall of the passageway provides an abutment part which extends transverse to said axis and abuts said transversely extending part of said member and said abutment part is laterally displaceable, to permit the release of the member from the element, when a predetermined separating force is applied to the member parallel to said axis.

4. A fishing tackle according to claim 3 wherein the side wall of the passageway is divided to provide said abutment elements.

5. A fishing tackle according to claim 4 wherein resilient biasing means are provided normally to bias a transverse abutment part into attaching relationship with the transversely extending part and to permit the abutment part to be displaced out of said attaching relationship when said predetermined separating force is applied.

6. A fishing tackle according to claim 5 wherein the transverse abutment part comprises a pair of transversely extending abutment elements and said abutment elements are acted upon by said resilient biasing means normally to bias said elements together and to permit the elements to be displaced transversely away from each other by said resultant force.

7. A fishing tackle according to claim 6 wherein the resilient biasing means comprises a spring element having a tubular body mounted on the attachment means with a longitudinal axis of the tube parallel to said axis of the element and there being an opening in said body to receive said transversely extending part of the member.

8. A fishing tackle according to claim 1 wherein the member is a hook and the body part of the hook comprises a shank having, at one end, said functional part, which comprises a hook-shaped tine, and having, at the other end, said transversely extending part and said retaining means.

9. A fishing tackle according to claim 1 wherein the wall of the passageway is formed with projections releasably to engage and retain the transversely extending part adjacent said part of the side wall of the passageway.

10. A fishing tackle according to claim 1 wherein the member is a hook and the hook is engaged with the first attachment means and the body part of the hook comprises a shank having, at one end, said functional part, which comprises a barbed hook shaped tine, and having, at the other end, said transversely extending part and said retaining means and, adjacent said other end of the shank, the hook is of generally U-shape, one limb of the U being integral with the shank of the hook, and the other limb of the U providing said retaining means and being of shorter length than the shank of the hook, terminating at a free end and the base part of the U comprising said transversely extending part of the hook.

11. A fishing tackle comprising an elongate snood having an elongate small diameter body part, of drawn synthetic plastics material, and, integral therewith at one end of the body part, an enlarged pre-formed undrawn synthetic plastics material, first attachment means whereby a member is attached to the snood, wherein said attachment means comprises an enlarged portion, at one end of the elongate body part, a transversely extending passageway through said enlarged portion, a side wall of the passageway at a part thereof distant from the elongate body part providing an abutment part and said member comprising a body part having a functional part and a retaining part spaced transversely from the member body part and connected thereto by a transversely extending part of the member and said retaining part being passed through said passage from one end thereof so that the abutment part of the attachment means is embraced by the member body part, retaining part and transversely extending part of the member.

12. A fishing tackle according to claim 11 wherein the member is a hook and the body part of the hook comprises a shank having, at one end, said functional part, which comprises a hook-shaped tine, and having, at the other end, said transversely extending part and said retaining part.

13. A fishing tackle according to claim 11 wherein the wall of the passageway is formed with projections releasably to engage and retain the transversely extending part adjacent said part of the side wall of the passageway.

14. A fishing tackle according to claim 11 wherein an abutment part is laterally displaceable, to permit the release of the member from the element, when a predetermined separate force is applied to the member parallel to said axis.

15. A fishing tackle according to claim 11 wherein the element is provided with a second attachment means similar to said first attachment means.

16. A fishing tackle according to claim 11 wherein the member is a hook and the hook is engaged with the first attachment means and the body part of the hook comprises a shank having, at one end, said functional part, which comprises a hook shaped tine, and having, at the other end, said transversely extending part and said retaining part and, adjacent said other end of the shank, the hook is of generally U-shape, one limb of the U being integral with the shank of the hook, and the other limb of the U providing said retaining part and being of shorter length than the shank of the hook, terminating at a free end and the base part of the U comprising said transversely extending part of the hook.

17. A fishing tackle comprising an element having a first attachment means whereby a member is attached to the element wherein said attachment means comprises an elongate body part, an enlarged portion, at one end of the body part, a transversely extending passageway through said enlarged portion, a side wall of the passageway at a part thereof distant from the elongate body part providing an abutment part and said member comprising a body part having a functional part and a retaining part spaced transversely from the body part and connected thereto by a transversely extending part of the member and said retaining part being passed through said passage from one end thereof so that the abutment part of the attachment means is embraced by the body part, retaining part and transversely extending part of the member wherein the member is a swivel, and the swivel is engaged with the first attachment means or a second attachment means similar to the first attachment means, the body part of the swivel comprising a shank having, at one end, said functional part, which comprises a swivel connector to connect the body part rotatably to a further component, and has, at the other end, said transversely extending part and said retaining part.

18. A fishing tackle according to claim 17 wherein said other end of the shank of the swivel is of generally U-shape, one limb of the U being integral with the shank and the other limb of the U providing said retaining part and being of shorter length than the shank and terminating in a free end and the base part of the U comprising said transversely extending part.

19. A fishing tackle comprising an element having a first attachment means, whereby a first member is attached to the element, and a second attachment means which comprises a transversely extending part at the other end of the element to the first attachment means, the transversely extending part having a free end received within an opening of a second member, the transversely extending part of the second attachment means having a retaining means which projects transversely relative to the longitudinal extent of the transversely extending part and engages the member to retain the member in engagement with the transversely extending part wherein the retaining means is of a cross-section so as to be incapable of passage through the opening, in which case and wherein the element is attached to the member by passing the other end of the element through the opening of the member and then manipulating the length of the element through the opening followed by manipulating the transversely extending part into the opening until the retaining means abuts against the part defining the opening, wherein the second member is a swivel connector, said opening comprising an eye rotatably connected to a further eye or the like.

* * * * *